US012154437B2

(12) United States Patent
Guo

(10) Patent No.: US 12,154,437 B2
(45) Date of Patent: Nov. 26, 2024

(54) MOVING OBJECT POSITION ESTIMATION AND PREDICTION METHOD AND APPARATUS, DEVICE, AND MEDIUM

(71) Applicant: SOUTHWEST JIAOTONG UNIVERSITY, Chengdu (CN)

(72) Inventor: Jian Guo, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/679,268

(22) Filed: May 30, 2024

(65) Prior Publication Data

US 2024/0321111 A1 Sep. 26, 2024

Related U.S. Application Data

(63) Continuation of application No. PCT/CN2022/096399, filed on May 31, 2022.

(30) Foreign Application Priority Data

Dec. 1, 2021 (CN) ......................... 202111452502.4

(51) Int. Cl.
*G08G 3/02* (2006.01)

(52) U.S. Cl.
CPC ...................................... *G08G 3/02* (2013.01)

(58) Field of Classification Search
CPC ........................................................ G08G 3/02
USPC ..................................................... 340/539.13
See application file for complete search history.

(56) References Cited

U.S. PATENT DOCUMENTS 11,432,126 B2 * 8/2022 Morschhäuser ........ H04W 4/40
2008/0010357 A1 * 1/2008 Ye ........................ G06Q 10/083 709/207
2008/0101674 A1 * 5/2008 Begelman ............. G06T 7/0012 382/130

(Continued)

FOREIGN PATENT DOCUMENTS

CN 107918688 A 4/2018
CN 108769928 A 11/2018

(Continued)

OTHER PUBLICATIONS

International Search Report of PCT/CN2022/096399 (Aug. 25, 2022).

*Primary Examiner* — Richard A Goldman

(57) ABSTRACT

Embodiments of the application provide a position estimation and prediction method for a moving object. The method includes: updating a model parameter of a position prediction model according to a position data sequence of the moving object at a current sampling moment; determining position prediction data at the current sampling moment according to the position data sequence and the position prediction model after the model parameter is updated; determining position estimation data at the current sampling moment according to the position prediction data and the position observation data at the current sampling moment; and determining position prediction data of a next sampling moment according to the position estimation data at the current sampling moment, the position data sequence and the position prediction model after the model parameter is updated, and entering an iteration operation of the next sampling moment.

7 Claims, 5 Drawing Sheets

(56) References Cited

U.S. PATENT DOCUMENTS

| | | | | |
|---|---|---|---|---|
| 2008/0103389 | A1* | 5/2008 | Begelman | G06T 7/62 600/425 |
| 2017/0356996 | A1* | 12/2017 | Lee | H04W 4/029 |
| 2020/0018844 | A1* | 1/2020 | Fridman | G08G 3/02 |
| 2022/0122464 | A1* | 4/2022 | Franklin | G06Q 50/40 |
| 2023/0124356 | A1* | 4/2023 | Ma | G08G 3/02 701/21 |
| 2024/0092464 | A1* | 3/2024 | Crawford | B63C 9/0011 |

FOREIGN PATENT DOCUMENTS

| | | | |
|---|---|---|---|
| CN | 110956338 | A | 4/2020 |
| CN | 111757242 | A | 10/2020 |
| CN | 114137587 | A | 3/2022 |

* cited by examiner

MOVING OBJECT POSITION ESTIMATION AND PREDICTION METHOD AND APPARATUS, DEVICE, AND MEDIUM

CROSS-REFERENCE TO RELATED APPLICATIONS

This application is a continuation of PCT Application PCT/CN2022/096399 filed on May 31, 2022, which is based upon and claims the benefit to CN patent application Ser. No. 202111452502.4A, filed on Dec. 1, 2021, the entire disclosures of which are incorporated herein by reference in their entireties for all purposes.

TECHNICAL FIELD

Embodiments of the present disclosure relate to the field of position data processing, and in particular, to a position estimation and prediction method and apparatus for a moving object, an electronic device, and a storage medium.

BACKGROUND

With increasing cross-sea bridge construction and flourishing development of marine transportation, safety of the cross-sea bridges is facing a serious threat from ship-bridge collision accidents. It is an important means to predict routes of ships sailing in a sea area of a bridge area, so as to judge a risk that the ship impacts the bridge.

In recent years, a ship automatic identification system (Automatic Identification System, AIS) has been widely used in observing ship positions. In terms of predicting a ship track, a widely used prediction method is a rate-based prediction method. In addition to the rate-based prediction method, there are a statistical analysis-based prediction method, a gray system-based prediction method, and a stochastic process-based prediction method.

However, No Matter for the Observation or Prediction of the Ship Positions, the Problem of Inaccurate Calculation of the Ship Positions Still Exists.

SUMMARY

Embodiments of the present disclosure provide a position estimation and prediction method and apparatus for a moving object, an electronic device, and a storage medium, so as to improve accuracy of position calculation of the moving object.

According to a first aspect, the embodiments of the present disclosure provide a position estimation and prediction method for a moving object, including:

updating a model parameter of a position prediction model according to a position data sequence of the moving object at a current sampling moment, where the position data sequence includes position observation data at a plurality of continuous sampling moments before the current sampling moment;

determining position prediction data at the current sampling moment according to the position data sequence and the position prediction model after the model parameter is updated;

determining position estimation data at the current sampling moment according to the position prediction data and the position observation data at the current sampling moment; and determining position prediction data of a next sampling moment according to the position estimation data at the current sampling moment, the position data sequence and the position prediction model after the model parameter is updated, and entering an iteration operation of the next sampling moment until the position prediction data of the moving object meets an iteration ending condition.

According to a second aspect, the embodiments of the present disclosure further provide an electronic device, including:

one or more processors; and a memory configured to store one or more programs, where:

when the one or more programs are executed by the one or more processors, the one or more processors are enabled to implement the position estimation and prediction method for the moving object according to the embodiments of the present disclosure.

According to a third aspect, the embodiments of the present disclosure further provide a computer-readable storage medium storing a computer program thereon, where the program, when executed by a processor, implements the position estimation and prediction method for the moving object according to the embodiments of the present disclosure.

DESCRIPTION OF EMBODIMENTS

Figure 1:
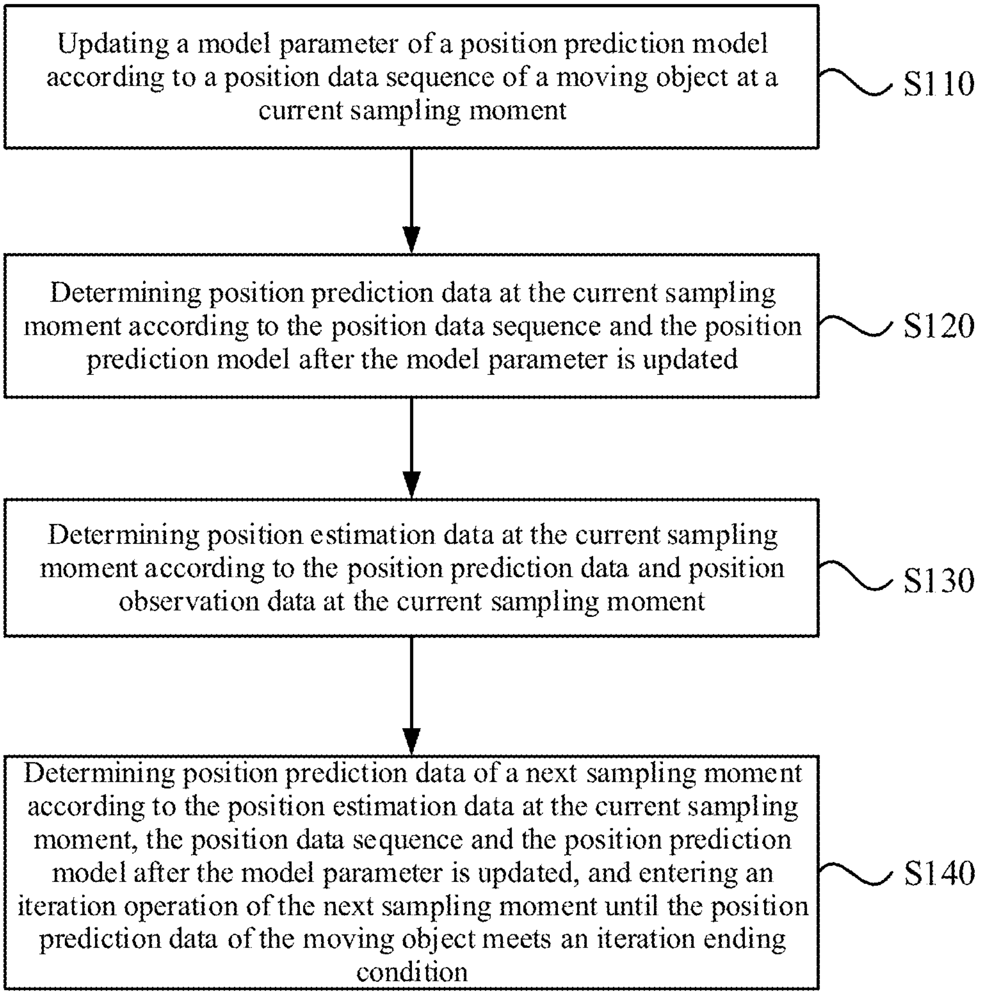
FIG. 1 is a schematic flowchart of a position estimation and prediction method for a moving object provided by an embodiment of the present disclosure.

The embodiments of the present disclosure will be described in further detail hereinafter with reference to the drawings. Although some embodiments of the present disclosure are shown in the drawings, it should be understood that the present disclosure may be embodied in various forms and should not be construed as limited to the embodiments set forth herein. On the contrary, these embodiments are provided for a more thorough and complete understanding of the present disclosure. It should be understood that the drawings and the embodiments of the present disclosure are only for exemplary purposes, and are not intended to limit the scope of protection of the present disclosure.

It should be understood that the steps described in the method embodiments of the present disclosure may be performed in different order, and/or performed in parallel. Moreover, the method embodiments may include additional steps and/or omit performing the illustrated steps. The scope of the present disclosure is not limited in this respect.

The term "including" and similar terms thereof used herein represent open inclusion, which means, "including but not limited to". The term "based on" is "based at least in part on". The term "one embodiment" means "at least one embodiment"; the term "another embodiment" means "at least one another embodiment"; and the term "some embodiments" means "at least some embodiments". Relevant definitions of other terms will be given in the following description.

It should be noted that "one" and "more" mentioned in the present disclosure are schematic rather than restrictive, and should be understood as "one or more" by a person skilled in the art unless clearly indicated otherwise in the context.

With increasing cross-sea bridge construction and flourishing development of marine transportation, safety of the cross-sea bridges is facing a serious threat from ship-bridge collision accidents. It is an important means to predict routes of ships sailing in a sea area of a bridge arca, so as to judge a risk that the ship impacts the bridge.

In recent years, a ship AIS, which has been widely used in observing a ship position, can track and locate the ship position by using satellite and other devices. In the aspect of predicting a ship track, a widely used prediction method is a rate-based prediction method, that is, after acquiring a position, a speed and a direction of an object at last moment, an object position at a next moment is directly considered as a distance obtained by translating an instantaneous rate of the moment along a line where the moving direction is located multiplied by a monitoring period. In addition to the rate-based prediction method, there are also statistical analysis-based prediction methods, such as least square method and autoregressive integrated moving average model (Autoregressive Integrated Moving Average model, ARIMA), and the like; gray system-based prediction methods, such as first-order differential method, Gaussian process method and recurrent neural network method (including further developed long-short-term neural network and Gated Recurrent Unit (Gated Recurrent Unit, GRU), and the like; and stochastic process-based prediction methods, such as Hidden Markov method, Ornstein-Uhlenbeck process, and the like.

However, the position observation and prediction methods for ships above still have the problem of inaccurate calculation of the positions, which are analyzed as follows.

1. In the case of using the AIS for ship positioning, there may be the following issues. First of all, AIS data are propagated through satellite signals, which will have a certain delay, resulting in the lag of ship position information; secondly, the AIS data may be missing or obviously abnormal occasionally, which will greatly affect bridge administrators to estimate the ship position; and finally, from mathematical statistics, the ship position acquired by the AIS only represents a measured value, and there will be some random error with a real position of the ship. If a Global Positioning System (GPS) is not checked in China's coastal areas, there will be an error of about 100 meters in a general GPS ship position, including a coordinate system error of about 50 meters, a sea chart and drawing error of about 20 meters and a pseudo-distance error of about 20 meters. These errors are acceptable for ship positioning in vast sea. However, when the ship crosses a spatial scale of only a few kilometers such as a cross-sea bridge, the positioning accuracy is not satisfactory, because the ship can often hit the bridge with a yaw of tens of meters.

2. In the case of predicting a future position of the ship by using the rate-based method, the position of the moving object is always sent and acquired at intervals, but the position of the moving object has a characteristic of continuous change. This leads to loss of the position of the moving object in a short period of time (that is, within a measurement period of a monitoring system) (at present, a measurement period of the AIS is generally 30 seconds, while it takes about 10-20 minutes for the ship to cross the bridge, so a risk of bridge collision once the ship deviates during the measurement interval cannot be ignored), during which the ship may deviate from a channel, resulting in a large error in the rate-based prediction method sometimes.

3. In case of predicting a track of the moving object, for the statistical analysis-based prediction methods, such methods only give a more suitable fitting curve from a statistical point of view according to time series data, but such methods do not reveal an internal mechanism of a model. Therefore, it is acceptable to predict unknown points within a data boundary by using such methods, but it is poor to predict unknown points outside the data boundary by using such methods, that is, it is not suitable to predict the position of the ship at a next moment. For the gray system-based prediction methods, such methods often need a lot of data to train the model. For a specific single ship, there is only one time series data, and a training effect is often not satisfying. For the stochastic process-based prediction methods, firstly, a computing speed of such methods is slow, which makes it difficult to meet a real-time requirement of ship position prediction. Secondly, in terms of mechanism, the position of the ship at the next moment is often affected by change of relative positions of the ship and the bridge and a weather change at the last moment, which does not fully meet Markov property, and leads to the limitations for applying such methods.

In order to overcome the defects above-mentioned, the present disclosure provides a position estimation and prediction method for a moving object.

FIG. 1 is a schematic flowchart of the position estimation and prediction method for the moving object provided by an embodiment of the present disclosure. The method may be implemented by a position estimation and prediction apparatus for a moving object, where the apparatus is implemented by software and/or hardware, may be configured in an electronic device, and is typically configured in a control terminal of a ship. The position estimation and prediction method for the moving object provided by the embodiment of the present disclosure is suitable for a scene where the position of the moving object is determined, and is typically suitable for a scene where the position of the ship is estimated to avoid collision between the ship and a cross-sea bridge after the ship sails into a sea area where the cross-sea bridge is located. As shown in FIG. 1, the position estimation and prediction method for the moving object provided by the embodiment may include the following steps.

At S110, a model parameter of a position prediction model is updated according to a position data sequence of the moving object at a current sampling moment.

The moving object is an observation object in a moving state, for example, the moving object is a vehicle such as a ship or an automobile, and the moving object may also be a person or an animal in a moving state. In this embodiment, a type of the moving object is not limited.

The position prediction model is a model used for predicting position prediction data of the moving object at the current sampling moment, that is, after the position prediction model acquires input data meeting requirements, the position prediction data of the moving object at the current sampling moment can be output. The position prediction model is provided with the model parameter, and the model parameter is related to historical position observation data of the moving object. It is visible that the position prediction data at the current sampling moment is position data related to the historical position observation data of the moving object. The position observation data is position data observed by a positioning system, for example, the position data of the moving object at the current sampling moment observed by a satellite positioning system. In this embodiment, in addition to the two types of position data (the position observation data and the position prediction data), there is also a position data type, i.e., position estimation data. The position estimation data is position data determined according to the position observation data and the position prediction data, that is, the position estimation data is position data determined by combining the historical position observation data of the moving object with actual positioning data of the moving object.

The historical position observation data of the moving object may be represented by the position data sequence, which includes position observation data at a plurality of continuous sampling moments before the current sampling moment.

In this embodiment, the model parameter of the position prediction model is updated by using the position data sequence of the moving object at the current sampling moment. Because the position data sequence represents the historical position observation data of the moving object before the current sampling moment, the updated model parameter can reflect information of the historical position observation data of the moving object before the current sampling moment, so that a position data value obtained when the position prediction model is used to determine the position prediction data at the current sampling moment is more accurate.

In a specific application scene, the moving object is a ship, and the position prediction model is a model used for predicting the position prediction data o(t) of the ship at the current sampling moment t. The position data sequence {l(t−h), . . . , l(t−2), l(t−1)} includes position observation data of h continuous sampling moments before the current sampling moment t, and the position observation data is observed by a monitoring device of an AIS. The model parameter $k_f$ of the position prediction model is updated according to the position data sequence {l(t−h), . . . , l(t−2), l(t−1)} of the ship at the current sampling moment t, so that the updated model parameter $k_f$ can reflect correlation between the position observation data of the h sampling moments before the current sampling moment t and the position prediction data at the current sampling moment t.

At S120, the position prediction data at the current sampling moment is determined according to the position data sequence and the position prediction model after the model parameter is updated.

After determining the updated model parameter, the position prediction data at the current sampling moment can be determined according to the position data sequence and the position prediction model after the model parameter is updated.

In this embodiment, input data of the position prediction model is the position data sequence, that is, when calculating the position prediction data at the current sampling moment, the position observation data at the plurality of continuous sampling moments before the current sampling moment are used as the input data of the position prediction model. Because the model parameter of the position prediction model is also obtained based on the position data sequence, the position prediction data at the current sampling moment output by the position prediction model has a strong correlation with the position observation data at the plurality of continuous sampling moments before the current sampling moment, which reflects continuity among a plurality of position data. The position prediction model in this embodiment reveals influence of the position observation data at the previous sampling moment on the position prediction data at the later sampling moment. Meanwhile, there is no need to train a large number of position observation data when calculating the model parameter in the position prediction model, which simplifies a model determining process.

In an application scene where the moving object is a ship, the position prediction data o(t) at the current sampling moment is determined according to the position data sequence {l(t−h), . . . , l(t−2), l(t−1)} and the position prediction model after updating the model parameter $k_f$.

At S130, the position estimation data at the current sampling moment is determined according to the position prediction data and the position observation data at the current sampling moment.

In this embodiment, the determining the position estimation data at the current sampling moment according to the position prediction data and the position observation data at the current sampling moment may include: performing data fusion on the position prediction data and the position observation data at the current sampling moment to obtain the position estimation data at the current sampling moment.

By fusing the position prediction data and the position observation data at the current sampling moment, the position estimation data at the current sampling moment can be obtained, so that the position estimation data can overcome uncertainty in the position prediction data and the position observation data at the same time.

In the application scene where the moving object is a ship, the position estimation data $\hat{Z}(t)$ at the current sampling moment is determined according to the position prediction data o(t) and the position observation data l(t) at the current sampling moment t, and the position estimation data $\hat{Z}(t)$ is optimal ship position estimation data considering both an error of the position prediction model and a measurement error of the AIS.

At S140, position prediction data of a next sampling moment is determined according to the position estimation data at the current sampling moment, the position data sequence and the position prediction model after the model parameter is updated, and an iteration operation of the next sampling moment is entered until the position prediction data of the moving object meets an iteration ending condition.

After determining the position estimation data at the current sampling moment, the position estimation data at the current sampling moment and the current position data sequence may be used to determine the input data of the position prediction model, and the obtained input data may be input into the position prediction model after the model parameter is updated to obtain the position prediction data of the next sampling moment.

After determining the position prediction data of the next sampling moment according to the position estimation data at the current sampling moment, the position data sequence and the position prediction model after the model parameter is updated, the method further includes: outputting the position prediction data of the next sampling moment.

The steps in S110-S140 are iteratively executed until the position prediction data of the moving object meets the iteration ending condition. The iteration ending condition may be that the position prediction data of the moving object is located outside a preset position data area, and the iteration ending condition is not limited in the present disclosure.

In this embodiment, the determining the position prediction data of the next sampling moment according to the position estimation data at the current sampling moment, the position data sequence and the position prediction model after the model parameter is updated, may include: adding the position estimation data at the current sampling moment to the position data sequence to obtain a new position data sequence; and determining the position prediction data of the next sampling moment according to the new position data sequence and the position prediction model after the model parameter is updated.

In the application scene where the moving object is a ship, the position estimation data $\hat{Z}(t)$ at the current sampling moment t is added to the position data sequence $\{l(t-h), \ldots, l(t-2), l(t-1)\}$ to obtain a new position data sequence $\{l(t-h), \ldots, l(t-2), l(t-1), \hat{Z}(t)\}$, and the position prediction data of the next sampling moment is determined according to the new position data sequence $\{l(t-h), \ldots, l(t-2), l(t-1), \hat{Z}(t)\}$ and the position prediction model after the model parameter $k_f$ is updated, and the iteration operation of the next sampling moment is entered until the position prediction data of the ship meets the iteration ending condition. The position prediction data of the ship meeting the iteration ending condition may mean that the position prediction data of the ship is located outside a position data range of a preset sea area, for example, the position prediction data of the ship is located in a position data range outside the sea area where the cross-sea bridge is located.

According to the position estimation and prediction method provided by the embodiment, the model parameter of the position prediction model is updated according to the position data sequence of the moving object at the current sampling moment, where the position data sequence includes the position observation data at the plurality of continuous sampling moments before the current sampling moment; the position prediction data at the current sampling moment is determined according to the position data sequence and the position prediction model after the model parameter is updated; the position estimation data at the current sampling moment is determined according to the position prediction data and the position observation data at the current sampling moment; and the position prediction data of the next sampling moment is determined according to the position estimation data at the current sampling moment, the position data sequence and the position prediction model after the model parameter is updated, and the iteration operation of the next sampling moment is entered until the position prediction data of the moving object meets the iteration ending condition. First of all, the model parameter of the position prediction model used for determining the position prediction data in the embodiments is constantly updated according to historical position observation data of the moving object, which reflects relevance and continuity among a plurality of position data. Secondly, there is no need to train a large number of position observation data when calculating the model parameter in the position prediction model, which can realize an effect of quickly determining the model parameter and improve real-time output of the position prediction data. Thirdly, the position estimation data in the embodiments is fusion data obtained according to the position prediction data and the position observation data, which can overcome positioning deviation in the position observation data and uncertainty in the position prediction data, realize accurate positioning of the moving object, and improve accuracy of the position calculation of the moving object.

Figure 2:
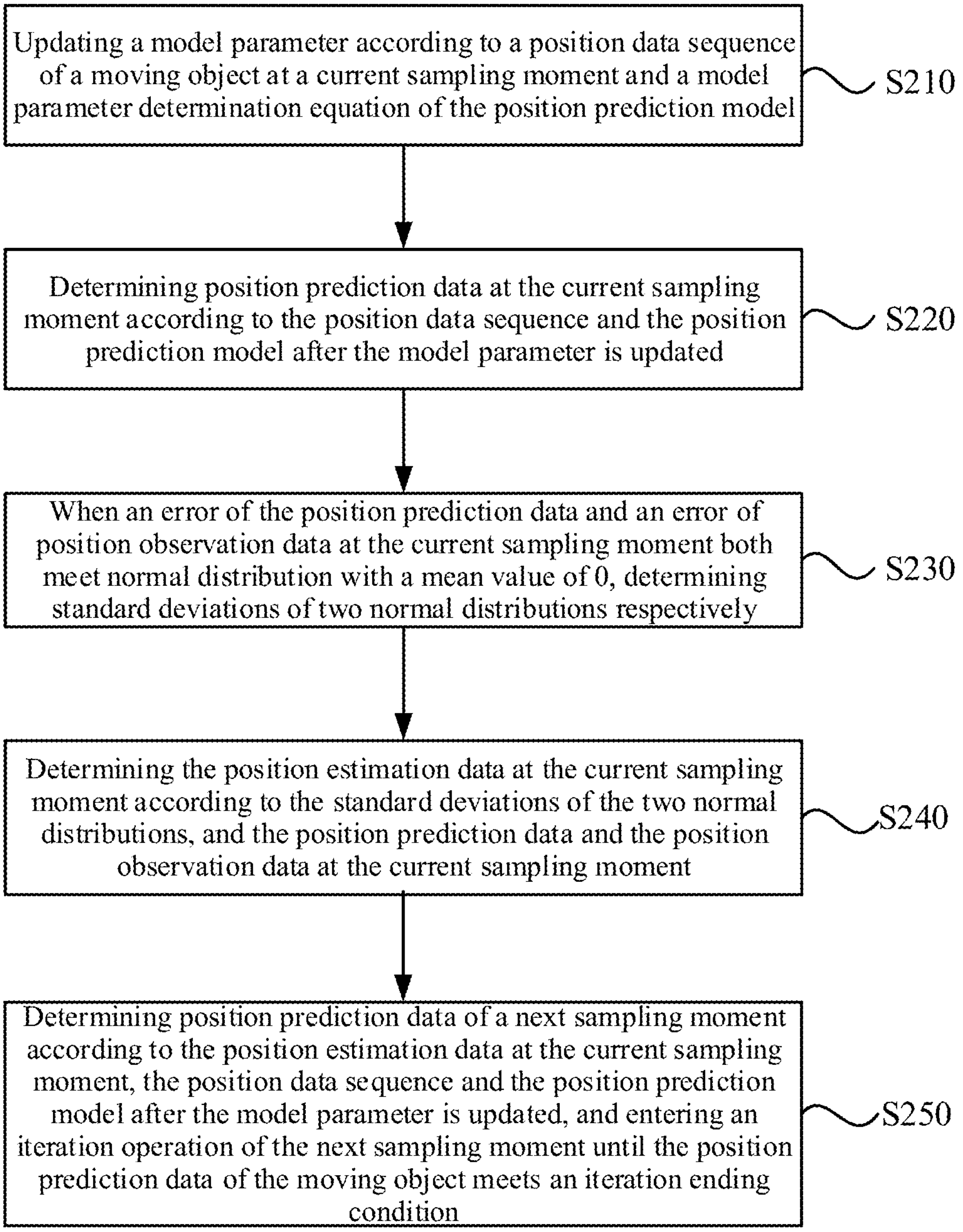
FIG. 2 is a schematic flowchart of another position estimation and prediction method for a moving object provided by an embodiment of the present disclosure.

FIG. 2 is a schematic flowchart of another position estimation and prediction method for a moving object provided by an embodiment of the present disclosure. The solution in this embodiment may be combined with one or more optional solutions in the above embodiment. As shown in FIG. 2, the position estimation and prediction method for the moving object provided by the embodiment may include the following steps.

At S210, a model parameter is updated according to a position data sequence of the moving object at a current sampling moment and a model parameter determination equation of the position prediction model.

The model parameter determination equation is:

$$\begin{bmatrix} s(t-2)^T \\ s(t-3)^T \\ \vdots \\ s(t-h+f-1)^T \end{bmatrix} \cdot k_f = \begin{bmatrix} l(t-1) \\ l(t-2) \\ \vdots \\ l(t-h+f) \end{bmatrix};$$

where $k_f$ is the model parameter of the position prediction model, $k_f$ is an f×n-dimensional matrix, n is determined by a number of coordinate parameters in a position state vector of the moving object, f is a backtracking coefficient, $$S(t-2) = \begin{bmatrix} l(t-2) \\ l(t-3) \\ l(t-4) \\ \vdots \\ l(t-h+f) \end{bmatrix},$$

$\{l(t-h), \ldots, l(t-2), l(t-1)\}$ is position observation data of n continuous sampling moments before the current sampling moment t, and $h>f>0$. The position prediction model is determined via a recursive function.

At S220, position prediction data at the current sampling moment is determined according to the position data sequence and the position prediction model after the model parameter is updated.

Determining the position prediction data o(t) at the current sampling moment t according to the following equation:

$$S(t-1)^T \times k_f = o(t).$$

In this embodiment, the process of determining the position prediction data and the determination equation of the model parameters according to the recursive function in the position prediction model is explained.

(1) Letting o(t) be the position prediction data of the moving object at the sampling moment t, o(t−1) be the position prediction data of the moving object at a sampling moment t−1 and so on, and o(t−f) be the position prediction data of the moving object at a sampling moment t−f, where f is a backtracking coefficient, representing a time to backtrack f sampling periods (when the moving object is a ship, for a general problem of ship position prediction, relevant research shows that when f=5, the position prediction data has enough accuracy), the following equation can be obtained through the above deduction:

$$S(t)=\begin{bmatrix} o(t) \\ o(t-1) \\ t(t-2) \\ \vdots \\ o(t-f+1) \end{bmatrix}=\begin{bmatrix} k_{n1} & k_{n2} & k_{n3} & \cdots & k_{nf} \\ 1 & 0 & 0 & \cdots & 0 \\ 0 & 1 & 0 & \cdots & 0 \\ 0 & 0 & 1 & \cdots & 0 \\ \vdots & \vdots & \vdots & \vdots & \vdots \end{bmatrix}\cdot\begin{bmatrix} o(t-1) \\ o(t-2) \\ o(t-3) \\ \vdots \\ o(t-f) \end{bmatrix}=\begin{bmatrix} k_{n1} & k_{n2} & k_{n3} & \cdots & k_{nf} \\ 1 & 0 & 0 & \cdots & 0 \\ 0 & 1 & 0 & \cdots & 0 \\ 0 & 0 & 1 & \cdots & 0 \\ \vdots & \vdots & \vdots & \vdots & \vdots \end{bmatrix}\cdot S(t-1)$$

where $k_{ij}$ is an unknown number to be determined, a matrix composed of $k_{ij}$ is abbreviated as $K_0$, that is, there is $S(t)=K_0\cdot S(t-1)$. By extracting and expanding a first line of the above equation, we can get $S(t-1)^T\times k_f=o(t)$, $k_f$ is an f×n-dimensional matrix, and n is determined by a number of coordinate parameters in a position state vector of the moving object.

(2) Substituting {l(t−h), . . . , l(t−2), l(t−1)} obtained in S210 as a known quantity into S(t) under the rule described in step (1), the following system of equations can be obtained, that is, the model parameter determination equation:

$$\begin{bmatrix} s(t-2)^T \\ s(t-3)^T \\ \vdots \\ s(t-h+f-1)^T \end{bmatrix}\cdot k_f=\begin{bmatrix} l(t-1) \\ l(t-2) \\ \vdots \\ l(t-h+f) \end{bmatrix}$$

(3) For the system of equations obtained in step (2), when h−f≤nf, the system of equations has a strict solution, and $k_f$ can be calculated by solving the above system of equations in this case; when h−f>nf, a number of equations h−f is greater than an unknown number nf. In this case, an error minimization condition is considered, that is, one set of $k_f$ values is obtained to minimize a sum of squares of distance between the position prediction data and the position observation data, that is, requiring that $$\min\sum_{a=t-h}^{a=t-1}|l(a)-o(a)|^2.$$

Here, a very mature matrix singular value decomposition method may be used to obtain the best set of $k_f$ solutions. In this case, errors of the position prediction data and the position observation data are:

$$\sqrt{\min\sum_{a=t-h}^{a=t-1}|l(a)-o(a)|^2}.$$

Certainly, other matrix decomposition methods can also be used to solve $k_f$.

(4) After calculating $k_f$, a recursive relation of the position data of the moving object can be obtained, and substituted into $S(t-1)^T\times k_f=o(t)$ to obtain the position prediction data of the moving object at the sampling moment t.

At S230, when an error of the position prediction data and an error of the position observation data at the current sampling moment both meet normal distribution with a mean value of 0, standard deviations of two normal distributions are respectively determined.

In this embodiment, it is set that the error of the position prediction data and the error of the position observation data both meet the normal distribution with the mean value of 0, in this case, standard deviations of two normal distributions can be determined, where the standard deviation of the normal distribution met by the error of the position prediction data is $$\sqrt{\min\sum_{a=t-h}^{a=t-1}|l(a)-o(a)|^2},$$

and the standard deviation of the normal distribution met by the error of the position observation data is obtained according to an actual situation of a positioning system.

At S240, the position estimation data at the current sampling moment is determined according to the standard deviations of the two normal distributions, and the position prediction data and the position observation data at the current sampling moment.

In this embodiment, confidence coefficients corresponding to the position prediction data and the position observation data at the current sampling moment can be calculated according to the standard deviations of the two normal distributions, and the confidence coefficients are used to characterize a deviation degree of the position estimation data between the position prediction data and the position observation data.

The position estimation data at the current sampling moment is determined according to the confidence coefficients respectively corresponding to the position prediction data and the position observation data at the current sampling moment, and the position prediction data and the position observation data at the current sampling moment.

At S250, position prediction data of a next sampling moment is determined according to the position estimation data at the current sampling moment, the position data sequence and the position prediction model after the model parameter is updated, and an iteration operation of the next sampling moment is entered until the position prediction data of the moving object meets an iteration ending condition.

In the position estimation and prediction method for the moving object provided by this embodiment, the model parameter determination equation and the position prediction data are determined by a recursive function, which reflects correlation between the position prediction data output in the position prediction model and the input position observation data, and the input data is part of the position observation data of the current moving object, so a data volume is small, which makes a speed of updating the model parameter and calculating the position prediction data faster and realizes real-time data output. In this embodiment, when the position observation data and the position prediction data are fused, the deviation degree of the position estimation data between the position prediction data and the position observation data is determined according to the error of the position prediction data and the standard deviation of the normal distribution met by the error of the position observation data, so that the obtained position estimation data is more accurate, and then the obtained position estimation data is applied to the position prediction model to realize accurate calculation of the position of the moving object.

Figure 3:
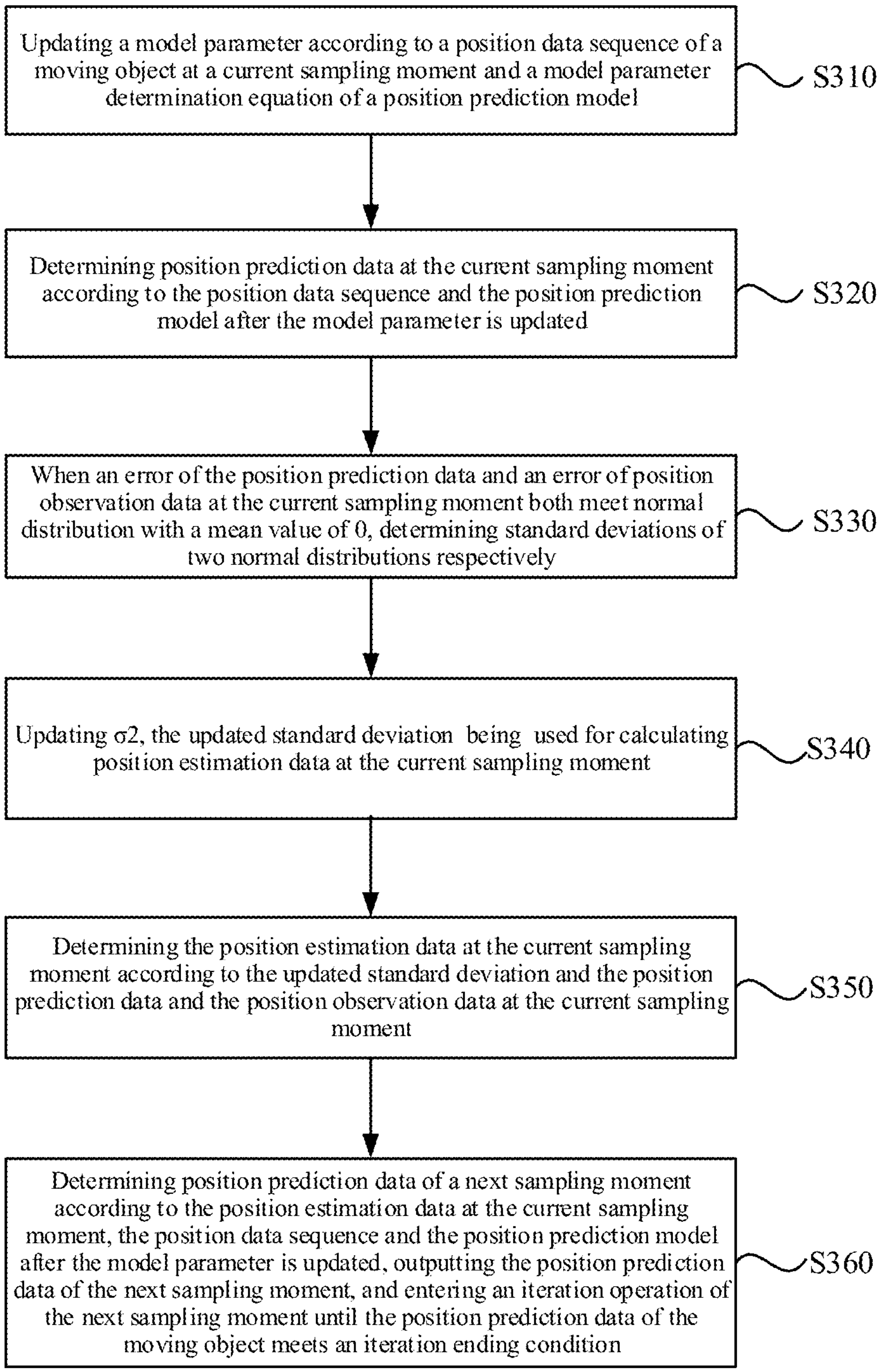
FIG. 3 is a schematic flowchart of another position estimation and prediction method for a moving object provided by an embodiment of the present disclosure.

FIG. 3 is a schematic flowchart of another position estimation and prediction method for a moving object provided by an embodiment of the present disclosure. The solution in this embodiment may be combined with one or more optional solutions in the above embodiments. As shown in FIG. 3, the position estimation and prediction method for the moving object provided by the embodiment may include the following steps.

At S310, a model parameter is updated according to a position data sequence of the moving object at a current sampling moment and a model parameter determination equation of the position prediction model.

At S320, the position prediction data at the current sampling moment is determined according to the position data sequence and the position prediction model after the model parameter is updated.

At S330, when an error of the position prediction data and an error of the position observation data at the current sampling moment both meet normal distribution with a mean value of 0, standard deviations of two normal distributions are respectively determined.

The error of the position prediction data at the current sampling moment meets the mean value of 0, the standard deviation is normal distribution of $$\sqrt{\min \sum_{a=t-h}^{a=t-1} |l(a)-o(a)|^2},$$

and donated as $\sigma_1$, the error of the position observation data at the current sampling moment t may also be written as meeting the mean value of 0, the standard deviation is normal distribution of $\sigma_2$, and a value of $\sigma_2$ may be tested according to an actual situation of a positioning system.

At S340, $\sigma_2$ is updated, where the updated standard deviation $\sigma_2$ is used for calculating position estimation data at the current sampling moment t.

In this embodiment, that $\sigma_2$ is updated includes: maintaining $\sigma_2$ unchanged when $$\frac{|l(t)-o(t)|}{o(t)} \le 20\%;$$

updating $\sigma_2$ to $$\sigma_2 \times \left(1 + \frac{|l(t)-o(t)|}{o(t)}\right)$$

when $$\frac{|l(t)-o(t)|}{o(t)} > 20\%.$$

After the position prediction data o(t) and the position observation data l(t) at the current sampling moment t are obtained, $\sigma_2$ is updated, and the confidence coefficients respectively corresponding to the position prediction data and the position observation data l(t) at the current sampling moment t can be updated by updating $\sigma_2$.

At S350, the position estimation data at the current sampling moment is determined according to the updated standard deviation and the position prediction data and the position observation data at the current sampling moment.

In this embodiment, the position prediction data $\hat{Z}(t)$ at the current sampling moment t is determined according to the following equation:

$$\hat{Z}(t) = o(t) + \frac{\sigma_1^2}{\sigma_1^2 + \sigma_2^2} \cdot (l(t) - o(t))$$

The above equation may be transformed into $$\hat{Z}(t) = \left(1 - \frac{\sigma_1^2}{\sigma_1^2 + \sigma_2^2}\right) o(t) + \frac{\sigma_1^2}{\sigma_1^2 + \sigma_2^2} l(t),$$

where $$1 - \frac{\sigma_1^2}{\sigma_1^2 + \sigma_2^2}$$

is the confidence coefficient corresponding to the position prediction data o(t) at the current sampling moment t, and $$\frac{\sigma_1^2}{\sigma_1^2 + \sigma_2^2}$$

is the confidence coefficient corresponding to the position observation data l(t) at the current sampling moment t.

In combination with the above step S340, when $$\frac{|l(t)-o(t)|}{o(t)} \le 20\%,$$

it can be considered that the fluctuation of the position observation data I(t) belongs to normal fluctuation, and no change will be made to $\sigma_2$. When $$\frac{|l(t)-o(t)|}{o(t)} > 20\%,$$

it can be considered that the positioning system may be abnormal, so the trust in the position observation data l(t) is weakened and $\sigma_2$ is updated to $$\sigma_2 \times \left(1 + \frac{|l(t)-o(t)|}{o(t)}\right)$$

to reduce the confidence coefficient corresponding to the position observation data l(t).

Moreover, it should be noted that when the position observation data at one sampling moment is lost, the position prediction data at the sampling moment can be directly output as the position estimation data in this embodiment without affecting the system operation.

At S360, position prediction data of a next sampling moment is determined according to the position estimation data at the current sampling moment, the position data sequence and the position prediction model after the model parameter is updated, the position prediction data of the next sampling moment is output, and an iteration operation of the next sampling moment is entered until the position prediction data of the moving object meets an iteration ending condition.

The position estimation and prediction method for the moving object provided by this embodiment further explains the position estimation data and the calculation method of the confidence coefficient. The position prediction data reflects theory of the position data of the moving object, and the position observation data reflects practicality of the position data of the moving object. The position prediction data and the position observation data are fused, and a trust degree of the position prediction data and the position observation data is considered in the process of data fusion, so that the obtained data fusion result-position estimation data both has theory and practicality. The position estimation data is fed back to the position prediction model to determine a new position prediction data, and this iteration is performed, so that a final output motion track composed of the position prediction data at a plurality of sampling moments can reflect a real motion track of the moving object.

Figure 4:
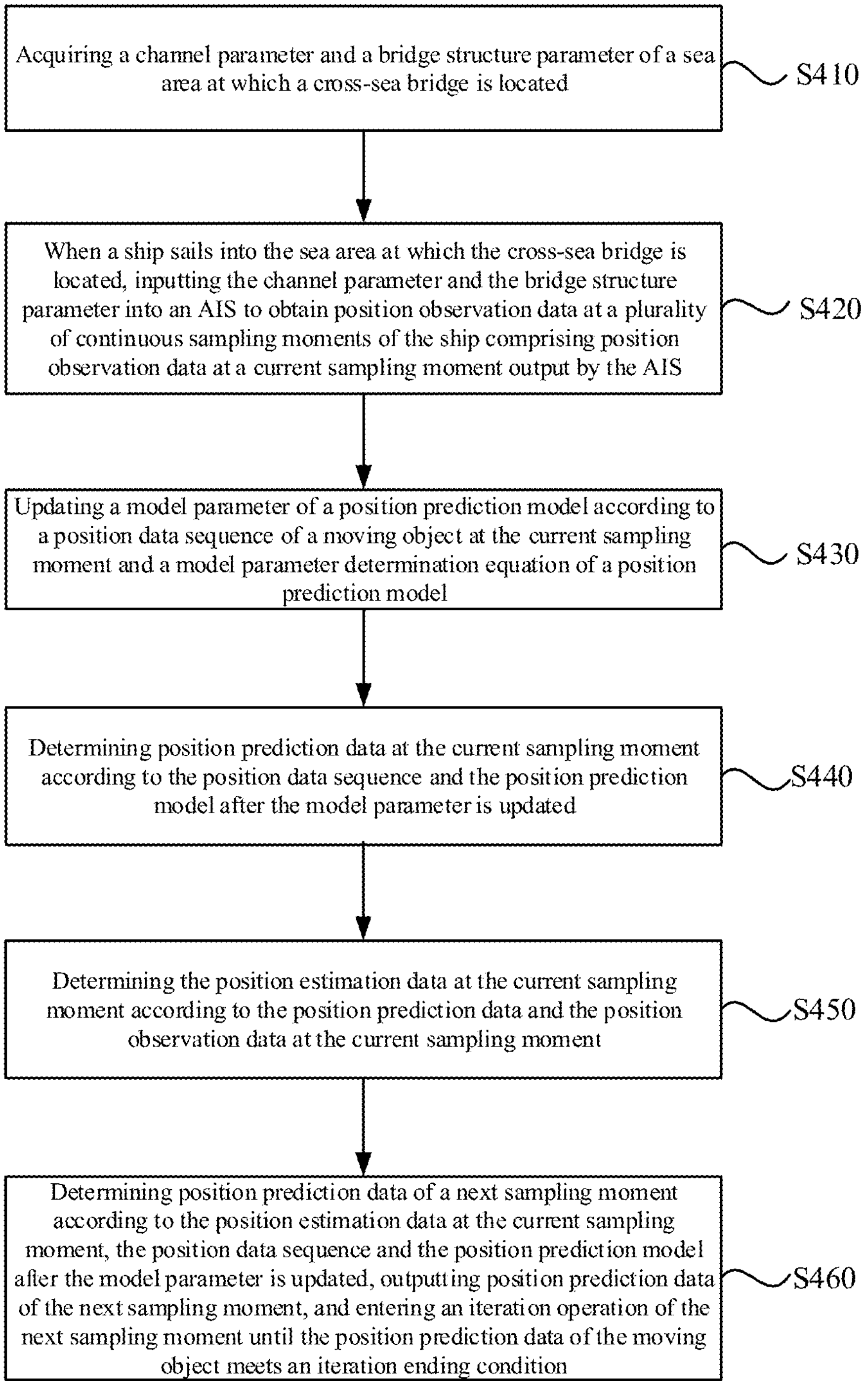
FIG. 4 is a schematic flowchart of another position estimation and prediction method for a moving object provided by an embodiment of the present disclosure.

FIG. 4 is a schematic flowchart of another position estimation and prediction method for a moving object provided by an embodiment of the present disclosure. The solution in this embodiment may be combined with one or more optional solutions in the above embodiments. In this embodiment, the technical solution of the present disclosure is illustrated by taking the moving object being a ship, and an application scene being that the ship enters a sea area where a cross-sea bridge is located, a position of the ship is estimated to avoid collision between the ship and the cross-sea bridge as an example. As shown in FIG. 4, the position estimation and prediction method for the moving object provided in this embodiment may include the following steps.

At S410, a channel parameter and a bridge structure parameter of the sea area at which the cross-sea bridge is located are acquired.

The channel parameter includes a width of the planned channel, a position of a center line of the channel, a type and a size of a ship passing through the channel, and the bridge structural parameter includes a span of the bridge (including a span of a main navigable bridge and a span of a non-navigable bridge), a size (including a length and a width of a pier of the main navigable bridge and a length and a width of a pier of the non-navigable bridge) and a position (a distance from the center line of the channel) of a pier.

At S420, when the ship sails into the sea area at which the cross-sea bridge is located, the channel parameter and the bridge structure parameter are input into an AIS to obtain position observation data at a plurality of continuous sampling moments of the ship including the position observation data at the current sampling moment output by the AIS.

In this embodiment, the position observation data at the plurality of continuous sampling moments is {l($t_c$−h), . . . , l(t−h+2), l(t−h+3), . . . , l(t)}, {l(t−h), . . . , l(t−2), l(t−1)} is used as a position data sequence of the ship at the current sampling moment, and the position observation data at each sampling moment may be expressed as position state vectors ($x_1$,$x_2$), where $x_1$ is parallel to a direction of a bridge axis and $x_2$ is vertical to the direction of the bridge axis.

At S430, a model parameter of the position prediction model is updated according to a position data sequence of the moving object at the current sampling moment and a model parameter determination equation of the position prediction model.

The position prediction data of the ship in this embodiment is a two-dimensional position state vector. The position data of the ship in the direction vertical to the bridge axis and the position data of the ship in the direction parallel to the bridge axis are not independent (for example, when a speed of the ship in the direction parallel to the bridge axis increases, it generally means that the ship is turning or sailing obliquely, which will lead to the speed in the direction perpendicular to the bridge axis decreasing). For a two dimensional position prediction problem, recursive equations of S(t) and S(t−1) may be written as follows:

$$\begin{bmatrix} o(t)x_1 \\ o(t)x_2 \\ o(t-1)x_1 \\ o(t-1)x_2 \\ \dots \\ o(t-f+1)x_1 \\ o(t-f+1)x_2 \end{bmatrix} = \begin{bmatrix} k_{11} & k_{12} & k_{13} & \dots & k_{1f} \\ k_{21} & k_{22} & k_{23} & \dots & k_{2f} \\ 1 & 0 & 0 & \dots & 0 \\ 0 & 1 & 0 & \dots & 0 \\ \vdots & \vdots & \vdots & \vdots & \vdots \end{bmatrix} \cdot \begin{bmatrix} o(t-1)x_1 \\ o(t-1)x_2 \\ o(t-2)x_1 \\ o(t-2)x_2 \\ \dots \\ o(t-f)x_1 \\ o(t-f)x_2 \end{bmatrix}$$

where $k_f$ is an f×2-dimensional matrix, i.e., $$k_f = \begin{bmatrix} k_{11} & k_{21} \\ k_{12} & k_{22} \\ k_{13} & k_{23} \\ \dots & \dots \\ k_{1f} & k_{2f} \end{bmatrix}.$$

The model parameter determination equation in this embodiment has been explained in the previous embodiment, and will not be repeated here.

At S440, the position prediction data at the current sampling moment is determined according to the position data sequence and the position prediction model after the model parameter is updated.

The position prediction data at the current sampling moment t is determined according to position observation data at f continuous sampling moments before the current sampling moment t in {l(t−h), . . . , l(t−2), l(t−1)} and the position prediction model using the model parameter $k_f$.

The equation for calculating the position prediction data in this embodiment has been explained in the previous embodiment, and will not be repeated here.

At S450, the position estimation data at the current sampling moment is determined according to the position prediction data and the position observation data at the current sampling moment t.

In this embodiment, the position prediction data $\hat{Z}(t)$ at the current sampling moment t is determined according to the following equation:

(1) The position prediction data and the position observation data l(t) of the ship at the current sampling moment t are obtained. An error of the position prediction data o(t) meets a mean value of 0, a standard deviation is normal distribution of $$\sqrt{\min \sum_{a=t-h}^{a=t-1} |l(a) - o(a)|^2},$$

and donated as $\sigma_1$ an error of the position observation data l(t) may also be written as meeting the mean value of $\sigma_1$, a standard deviation is normal distribution of $\sigma_2$, and a specific value of $\sigma_2$ may be tested according to an actual situation of the AIS.

(2) $\sigma_2$ is updated. When $$\frac{|l(t)-o(t)|}{o(t)} \leq 20\%,$$

it can be considered that the fluctuation of the position observation data l(t) belongs to normal fluctuation, and no change will be made to l(t). When $$\frac{|l(t)-o(t)|}{o(t)} > 20\%,$$

it can be considered that the AIS may be abnormal, so the trust in the position observation data I(t) is weakened and a value of $\sigma_2$ is modified into $$\sigma_2 \times \left(1 + \frac{|l(t)-o(t)|}{o(t)}\right)$$

in this case.

(3) Through the above preparatory work, the position estimation data of the ship at the current sampling moment t can be obtained:

$$\hat{Z}(t) = o(t) + \frac{\sigma_1^2}{\sigma_1^2 + \sigma_2^2} \cdot (l(t) - o(t)).$$

This value is the best estimation of the position of the ship at the current sampling moment after comprehensively considering uncertainty of the position prediction model and the position observation data, and can be used to judge a risk of the ship hitting the bridge in this case, so as to decide whether to take emergency management measures.

It should be noted that when the position observation data at one sampling moment is lost, the position prediction data at the sampling moment can be directly output as the position estimation data in this embodiment without affecting the system operation.

At S460, position prediction data of a next sampling moment is determined according to the position estimation data at the current sampling moment, the position data sequence and the position prediction model after the model parameter is updated, position prediction data of the next sampling moment is output, and an iteration operation of the next sampling moment is entered until the position prediction data of the moving object meets an iteration ending condition.

In this embodiment, the iteration ending condition includes: the position prediction data of the ship being located in a position data range outside the sea area at which the cross-sea bridge is located, where the sea area at which the cross-sea bridge is located is determined according to the channel parameter and the bridge structure parameter.

For step S450, taking one-dimensional motion as an example, it is supposed that at the sampling moment t, the position prediction data of the ship at the sampling moment t is predicated as 10 based on {l(t−f), . . . , l(t−2), l(t−1)}, and the standard deviation $\sigma_1$ is 4, and the position observation data of the ship at the sampling moment t acquired is 12, and a standard deviation $\sigma_2$ is 2, then the position estimation data of the ship at the sampling moment t is $$10 + \frac{4^2}{2^2 + 4^2}(12 - 10) = 11.6.$$

The value of 11.6 is substituted into the position prediction model to predict the position observation data of the ship at a sampling moment t+1, and output the position observation data for the reference of bridge administrators. At a sampling moment t+1, the position observation data 12 at the sampling moment t is added into the position data sequence of the ship, and the position prediction data at the sampling moment t+1 is predicted to be 50 based on {l(t−f+1), . . . , l(t−1), l(t)}, the standard deviation $\sigma_1$ is 4, the position observation data of the ship at the sampling moment t+1 acquired is 75, and the standard deviation $\sigma_2$ is 2, then the confidence coefficient of the position observation data needs to be updated first, and the updated $$\sigma_2 = 2 \times \left(1 + \frac{75-50}{50}\right) = 3.$$

Then, the position estimation data of the ship at the sampling moment t+1 is calculated as $$50 + \frac{4^2}{4^2 + 3^2}(75 - 50) = 66.$$

This value is the optimal estimation of the position of the ship at the sampling moment t+1, which comprehensively considers the position prediction data, the position observation data and a confidence degree of the position observation data.

In the position estimation and prediction method for the moving object provided by this embodiment, the technical solution of the present disclosure is illustrated by taking the moving object being a ship, and an application scene being that the ship enters the sea area where the cross-sea bridge is located, the position of the ship is estimated to avoid collision between the ship and the cross-sea bridge as an example. In this embodiment, when a motion state of the ship at a sampling moment suddenly changes (braking or steering), that is, when the position observation data of the ship at the last sampling moment is quite different from the position observation data at the next sampling moment, the change of the position observation data can be followed up in time, and the position estimation data after a navigation state of the ship suddenly changes can be output, so as to give an alarm to the abnormal ship in time. When there is no sudden change in the motion state of the ship, while the position observation data outputs abnormal values due to abnormal faults, although the accuracy of the output position prediction data will be affected, the confidence degree of the position observation data will be rapidly reduced, which will lead to the position estimation data trusting the position prediction data more, and realize compensation to some extent, thus reducing a false alarm rate.

Figure 5:
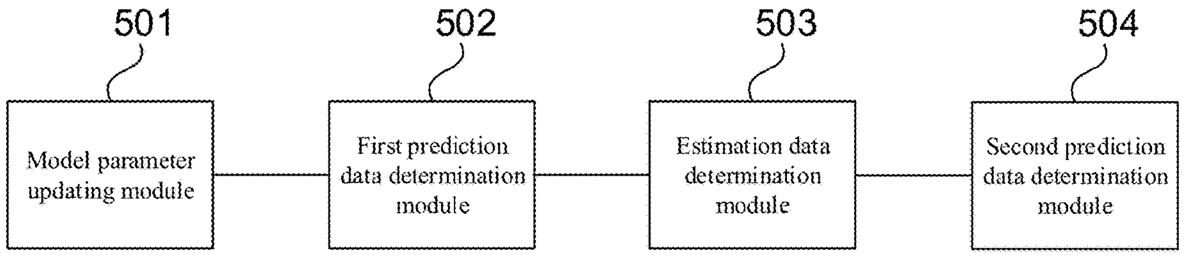
FIG. 5 is a structural block diagram of a position estimation and prediction apparatus for a moving object provided by an embodiment of the present disclosure.

FIG. 5 is a structural block diagram of a position estimation and prediction apparatus for a moving object provided by an embodiment of the present disclosure. The apparatus may be implemented by software and/or hardware, may be configured in an electronic device, and is typically configured in a control terminal of a ship, and position estimation can be implemented by using a position estimation and prediction method for a moving object. As shown in FIG. 5, the position estimation and prediction apparatus for the moving object provided by the embodiment may include: a model parameter updating module 501, a first prediction data determination module 502, an estimation data determination module 503 and a second prediction data determination module 504.

The model parameter updating module 501 is configured to update a model parameter of a position prediction model according to a position data sequence of the moving object at a current sampling moment, where the position data sequence includes position observation data at a plurality of continuous sampling moments before the current sampling moment.

The first prediction data determination module 502 is configured to determine position prediction data at the current sampling moment according to the position data sequence and the position prediction model after the model parameter is updated.

The estimation data determination module 503 is configured to determine position estimation data at the current sampling moment according to the position prediction data and the position observation data at the current sampling moment.

The second prediction data determination module 504 is configured to determine position prediction data of a next sampling moment according to the position estimation data at the current sampling moment, the position data sequence and the position prediction model after the model parameter is updated, and entering an iteration operation of the next sampling moment until the position prediction data of the moving object meets an iteration ending condition.

According to the position estimation and prediction apparatus provided by the embodiment, the model parameter of the position prediction model is updated according to the position data sequence of the moving object at the current sampling moment, where the position data sequence includes the position observation data at the plurality of continuous sampling moments before the current sampling moment; the position prediction data at the current sampling moment is determined according to the position data sequence and the position prediction model after the model parameter is updated; the position estimation data at the current sampling moment is determined according to the position prediction data and the position observation data at the current sampling moment; and the position prediction data of the next sampling moment is determined according to the position estimation data at the current sampling moment, the position data sequence and the position prediction model after the model parameter is updated, and the iteration operation of the next sampling moment is entered until the position prediction data of the moving object meets the iteration ending condition. First of all, the model parameter of the position prediction model used for determining the position prediction data in the embodiments is constantly updated according to historical position observation data of the moving object, which reflects relevance and continuity among a plurality of position data. Secondly, there is no need to train a large number of position observation data when calculating the model parameter in the position prediction model, which can realize an effect of quickly determining the model parameter and improve real-time output of the position prediction data. Thirdly, the position estimation data in the embodiments is fusion data obtained according to the position prediction data and the position observation data, which can overcome positioning deviation in the position observation data and uncertainty in the position prediction data, realize accurate positioning of the moving object, and improve accuracy of the position calculation of the moving object.

On the basis of the above solution, the position prediction model is determined via a recursive function, and the model parameter updating module 501 is specifically configured to:

update the initial model parameter according to the position data sequence and the model parameter determination equation of the position prediction model;

where the determination equation is:

$$\begin{bmatrix} S(t-2)^T \\ S(t-3)^T \\ \vdots \\ S(t-h+f-1)^T \end{bmatrix} \cdot k_f = \begin{bmatrix} l(t-1) \\ l(t-2) \\ \vdots \\ l(t-h+f) \end{bmatrix};$$

where $k_f$ is the model parameter of the position prediction model, $k_f$ is an f×n-dimensional matrix, n is determined by a number of coordinate parameters in a position state vector of the moving object, f is a backtracking coefficient, $$S(t-2) = \begin{bmatrix} l(t-2) \\ l(t-3) \\ l(t-4) \\ \vdots \\ l(t-f-1) \end{bmatrix},$$

$\{l(t-h), \ldots, l(t-2), l(t-1)\}$ is position observation data of n continuous sampling moments before the current sampling moment t, and h>f>0.

On the basis of the above solution, the first prediction data determination module 502 is specifically configured to:

determine the position prediction data o(t) at the current sampling moment t according to the following equation:

$$S(t-1)^T \times k_{nf} = o(t).$$

On the basis of the above solution, the estimation data determination module 503 includes:

an estimation data determination submodule, configured to perform data fusion on the position prediction data and the position observation data at the current sampling moment to obtain the position estimation data at the current sampling moment.

On the basis of the above solution, the estimation data determination submodule includes:

a standard deviation determination unit, configured to: when an error of the position prediction data and an error of the position observation data at the current sampling moment both meet normal distribution with a mean value of 0, respectively determine standard deviations of two normal distributions; and an estimation data determination unit, configured to determine the position estimation data at the current sampling moment according to the standard deviations of the two normal distributions, and the position prediction data and the position observation data at the current sampling moment.

On the basis of the above solution, the estimation data determination unit is specifically configured to:

determine a position estimation data $\hat{Z}(t)$ at the current sampling moment t according to the following equation:

$$\hat{Z}(t) = o(t) + \frac{\sigma_1^2}{\sigma_1^2 + \sigma_2^2} \cdot (l(t) - o(t));$$

where o(t) is the position prediction data at the current sampling moment t, l(t) is the position observation data at the current sampling moment t, $\sigma_1$ is the standard deviation of the error of the position observation data o(t) at the current sampling moment t meeting the normal distribution with the mean value of 0, and $\sigma_2$ is the standard deviation of the position observation data l(t) at the current sampling moment t meeting the normal distribution with the mean value of 0.

On the basis of the above solution, the estimation data determination submodule further includes: an updating unit configured to:

update $\sigma_2$, where the updated standard deviation $\sigma_2$ is used for calculating position estimation data $\hat{Z}(t)$ at the current sampling moment t.

On the basis of the above solution, the updating unit is specifically configured to:

maintain $\sigma_2$ unchanged when $$\frac{|l(t) - o(t)|}{o(t)} \leq 20\%;$$

update $\sigma_2$ to $$\sigma_2 \times \left(1 + \frac{|l(t) - o(t)|}{o(t)}\right)$$

when $$\frac{|l(t) - o(t)|}{o(t)} > 20\%.$$

On the basis of the above solution, the second prediction data determination module 504 is specifically configured to:

add the position estimation data at the current sampling moment to the position data sequence to obtain a new position data sequence; and determine the position prediction data of the next sampling moment according to the new position data sequence and the position prediction model after the model parameter is updated.

On the basis of the above solution, the position estimation and prediction apparatus for the moving object (ship) further includes a parameter acquisition module configured to:

acquire a channel parameter and a bridge structure parameter of a sea area at which a cross-sea bridge is located; and when the ship sails into the sea area at which the cross-sea bridge is located, input the channel parameter and the bridge structure parameter into an automatic identification system AIS to obtain position observation data at a plurality of continuous sampling moments of the ship including the position observation data at the current sampling moment output by the AIS.

On the basis of the above solution, the iteration ending condition includes:

the position prediction data of the ship being located in a position data range outside the sea area at which the cross-sea bridge is located, where the sea area at which the cross-sea bridge is located is determined according to the channel parameter and the bridge structure parameter.

On the basis of the above solution, the position estimation and prediction apparatus for the moving object further includes an output module configured to:

output the position prediction data of the next sampling moment.

The position estimation and prediction apparatus for the moving object provided by the embodiment of the present disclosure can execute the position estimation and prediction method for the moving object provided by any embodiment of the present disclosure, and has the corresponding functional modules and beneficial effects of executing the position estimation and prediction method for the moving object. For technical details not described in detail in this embodiment, please refer to the position estimation and prediction method for the moving object provided by any embodiment of the present disclosure.

Figure 6:
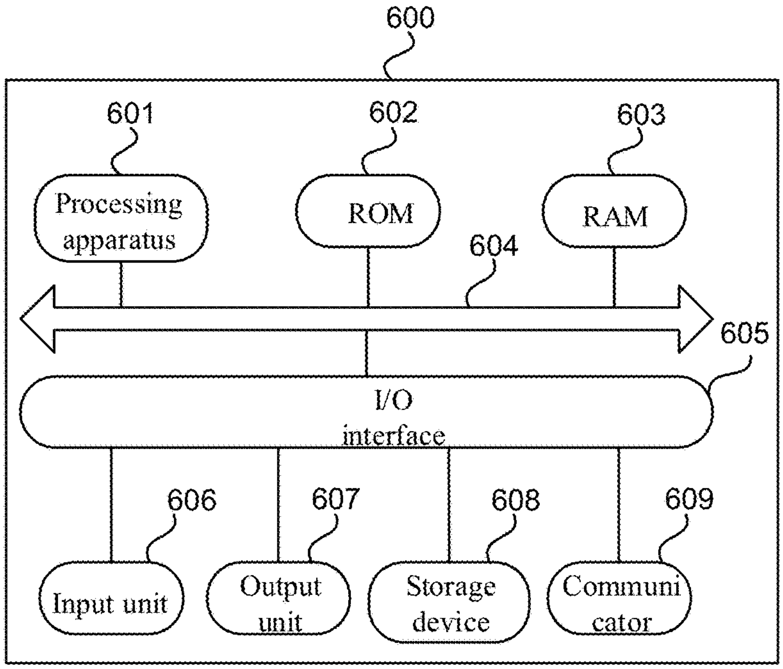
FIG. 6 is a schematic structural diagram of an electronic device provided by an embodiment of the present disclosure.

Referring to FIG. 6 below, FIG. 6 shows a schematic structural diagram of an electronic device (for example, a terminal device) 600 adapted to implement the embodiments of the present disclosure. The terminal device in the embodiments of the present disclosure may include, but is not limited to, a mobile terminal such as a mobile phone, a notebook computer, a digital broadcast receiver, a Personal Digital Assistant (PDA), a Portable Android Device (PAD), a Portable Multimedia Player (PMP), a vehicle-mounted terminal (for example, a vehicle-mounted navigation terminal), and the like, and a fixed terminal such as a digital TV or a desktop computer. The electronic device illustrated in FIG. 6 is merely an example and should not impose any limitation on the function and range of application of the embodiments of the present disclosure.

As shown in FIG. 6, the electronic device 600 may include a processing apparatus (for example, a central processing unit, a graphics processor, etc.) 601, which may perform various appropriate actions and processing according to programs stored in a Read-only Memory (ROM) 602 or programs loaded into a Random Access Memory (RAM) 603 from a storage device 608. In the RAM 603, various programs and data needed for operating the d electronic device 600 are also stored. The processing apparatus 601, the ROM 602, and the RAM 603 are connected to each other through a bus 604. An Input/Output (I/O) interface 605 is also connected to the bus 604.

Generally, the following apparatuses may be connected to the I/O interface 605: an input unit 606 including, for example, a touch screen, a touchpad, a keyboard, a mouse, a camera, a microphone, an accelerometer, a gyroscope, and the like; an output unit 807 including, for example, a Liquid Crystal Display (LCD), a loud speaker, a vibrator, and the like; a storage device 608 including, for example, a magnetic tape, a hard disk, and the like; and a communicator 609. The communicator 609 may allow the electronic device 600 to communicate wirelessly or wired with other devices to exchange data. Although FIG. 6 shows the electronic device 600 with various apparatuses, it should be understood that it is not required to implement or have all of the illustrated apparatuses. More or fewer apparatuses may alternatively be implemented or provided.

In particular, according to the embodiments of the present disclosure, the process described above with reference to the flowcharts may be implemented as a computer software program. For example, the embodiments of the present disclosure include a computer program product, including a computer program carried on a non-transitory computer-readable medium, and the computer program includes a program code for executing the method shown in the flowcharts. In such embodiments, the computer program may be downloaded and installed from the network through the communicator 609, or installed from the storage device 608, or installed from the ROM 602. When the computer program is executed by the processing apparatus 601, the foregoing functions defined in the methods in the embodiments of the present disclosure are performed.

It should be noted that the computer-readable medium described in the present disclosure may be a computer-readable signal medium or a computer-readable storage medium, or any combination of the two. The computer-readable storage medium may be, for example, but is not limited to, an electronic, magnetic, optical, electromagnetic, infrared, or semiconductor system, apparatus, or device, or any combination of the above. A more specific example of the computer-readable storage medium may include, but is not limited to, an electrical connection having one or more wires, a portable computer diskette, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above. The computer-readable storage medium in the present disclosure may be any tangible medium containing or storing a program that may be used by or in connection with an instruction execution system, apparatus, or device. The computer-readable signal medium in the present disclosure may include a data signal that is propagated in a baseband or as part of a carrier, in which a computer-readable program code is carried. Such propagated data signal may be in a variety of forms including, but not limited to an electromagnetic signal, an optical signal, or any suitable combination of the above. The computer-readable signal medium may also be any computer-readable medium other than a computer-readable storage medium, and the computer-readable signal medium can transmit, propagate or transport a program for use by or in connection with the instruction execution system, apparatus or device. The program code embodied on the computer-readable medium may be transmitted using any suitable medium, including but not limited to: an electric wire, an optical cable, a Radio Frequency (RF), and the like, or any suitable combination of the above.

In some embodiments, a client and a server may communicate using any currently known or future developed network protocol, such as HyperText Transfer Protocol (HTTP), and may be interconnected with any form or medium of digital data communication (for example, a communication network). Examples of the communication networks include Local Area Network ("LAN"), Wide Area Network ("WAN"), Internet Network (for example, the Internet), and end-to-end network (for example, ad hoc end-to-end network), as well as any currently known or future developed network.

The computer-readable medium above may be included in the electronic device above; and may exist alone without being assembled into the electronic device.

The computer-readable medium above carries one or more programs, and when the one or more programs are executed by the electronic device, the electronic device updates model parameters of a position prediction model according to a position data sequence of the moving object at a current sampling moment, where the position data sequence includes position observation data at a plurality of continuous sampling moments before the current sampling moment; determines position prediction data at the current sampling moment according to the position data sequence and the position prediction model after the model parameters are updated; determines position estimation data at the current sampling moment according to the position prediction data and the position observation data at the current sampling moment; and determines position prediction data of a next sampling moment according to the position estimation data at the current sampling moment, the position data sequence and the position prediction model after the model parameters are updated, and enters an iteration operation of the next sampling moment until the position prediction data of the moving object meets an iteration ending condition.

The computer program code for performing the operations of the present disclosure may be written in any combination of one or more programming languages or combinations thereof. The program languages above include an object-oriented programming language such as Java, Smalltalk, C++, etc., and further include conventional procedural programming language such as "C" language or a similar programming language. The program code can be executed entirely on a user computer, partially executed on the user computer, executed as a stand-alone software package, partially executed on the user computer and partially executed on a remote computer, or entirely executed on a remote computer or a server. In the case of involving in the remote computer, the remote computer can be connected to a user computer via any kind of network, including a Local Area Network (LAN) or a Wide Area Network (WAN), or can be connected to an external computer (e.g., connected via the Internet using an Internet service provider).

The flowcharts and block diagrams in the drawings show the possibly implemented architectures, functions, and operations of the system, the method, and the computer program product according to various embodiments of the present disclosure. In this regard, each block in the flowchart or the block diagram may represent one module, one program segment, or a part of code. The module, the program segment, or the part of code contains one or more executable instructions for implementing specified logical functions. It should also be noted that in some alternative implementations, the functions noted in the blocks may also occur in a different order from those noted in the drawings. For example, two consecutive blocks may actually be executed in substantially parallel, and sometimes may be executed in reverse order, depending on the functions involved. It should also be noted that each block in the block diagrams and/or flowcharts, and combinations of the blocks in the block diagrams and/or flowcharts, may be implemented with dedicated hardware-based systems that perform specified functions or actions, or may be implemented with combinations of dedicated hardware and computer instructions.

The units involved in the embodiments of the present disclosure may be implemented in a software manner, or may be implemented in a hardware manner. The name of the module does not constitute a limitation on the unit itself in some cases.

The functions described above herein may be performed, at least in part, by one or more hardware logic components. For example, without limitation, exemplary types of hardware logic components that may be used include: a Field Programmable Gate Array (FPGA), an Application-specific Integrated Circuit (ASIC), an Application-specific Standard Product (ASSP), a System-on-chip (SOC), a Complex Programmable Logic Device (CPLD), and the like.

In the context of the present disclosure, a machine-readable medium may be a tangible medium which may contain or store a program that may be used by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. A more specific example of the machine-readable storage medium may include an electrical connection having one or more wires, a portable computer diskette, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above.

According to the position estimation and prediction method and apparatus for the moving object provided by embodiments of the present disclosure, the device and the storage medium provided by the embodiments of the present disclosure, the model parameter of the position prediction model is determined according to the position data sequence of the moving object at the current sampling moment, where the position data sequence includes the position observation data at the plurality of continuous sampling moments before the current sampling moment; the position prediction data at the current sampling moment is determined according to the position data sequence and the position prediction model after the model parameter is updated; the position estimation data at the current sampling moment is determined according to the position prediction data and the position observation data at the current sampling moment; and the position prediction data of the next sampling moment is determined according to the position estimation data at the current sampling moment, the position data sequence and the position prediction model after the model parameter is updated, and the iteration operation of the next sampling moment is entered until the position prediction data of the moving object meets the iteration ending condition. First of all, the model parameter of the position prediction model configured to determine the position prediction data in the embodiments is constantly updated according to historical position observation data of the moving object, which reflects relevance and continuity among a plurality of position data. Secondly, there is no need to train a large number of position observation data when calculating the model parameter in the position prediction model, which can realize an effect of quickly determining the model parameter and improve real-time output of the position prediction data. Thirdly, the position estimation data in the embodiments is fusion data obtained according to the position prediction data and the position observation data, which can overcome positioning deviation in the position observation data and uncertainty in the position prediction data, realize accurate positioning of the moving object, and improve accuracy of the position calculation of the moving object.

The above description is only a description of the preferred embodiments of the present disclosure and the applied technical principles. The scope involved in the present disclosure is not limited to the technical solutions formed by the specific combinations of the above technical features, and also covers other technical solutions formed by any combination of the above technical features or equivalent features thereof without departing from the above concept of the present disclosure, for example, technical solutions formed by replacing the above-mentioned features with (but not limited to) technical features having similar functions in the present disclosure.

Further, although various operations are depicted in a particular order, it should not be understood that these operations are required to be performed in the particular order shown or in a sequential order. In certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single embodiment. Conversely, various features described in the context of a single embodiment may also be implemented in multiple embodiments separately or in any suitable sub-combination.

Although the subject matter has been described in language specific to structural features and/or methodological acts, it should be understood that the subject matter defined in the appended claims is not necessarily limited to the specific features or acts described above. Conversely, the specific features and acts described above are merely exemplary forms of implementing the claims.

What is claimed is:

1. A position estimation and prediction method for a moving object, comprising:

step 1: according to a position data sequence of the moving object at a current sampling moment and a model parameter determination equation of a position prediction model, updating a model parameter of the position prediction model, wherein the position data sequence comprises position observation data at a plurality of continuous sampling moments before the current sampling moment, and the position prediction model is determined via a recursive function; the determination equation is:

$$\begin{bmatrix} S(t-2)^T \\ S(t-3)^T \\ \vdots \\ S(t-h+f-1)^T \end{bmatrix} \cdot k_f = \begin{bmatrix} l(t-1) \\ l(t-2) \\ \vdots \\ l(t-h+f) \end{bmatrix},$$

$k_f$ is the model parameter of the position prediction model, $k_f$ is an f×n-dimensional matrix, n is determined by a number of coordinate parameters in a position state vector of the moving object, f is a backtracking coefficient, $$S(t-2) = \begin{bmatrix} l(t-2) \\ l(t-3) \\ l(t-4) \\ \vdots \\ l(t-f-1) \end{bmatrix},$$

{l(t−h), . . . , l(t−2), l(t−1)} is position observation data of n continuous sampling moments before the current sampling moment t, and h>f>0;

step 2: determining position prediction data at the current sampling moment according to a following equation: $S(t-1)^T \times k_f = o(t)$, wherein, o(t) is position prediction data at the current sampling moment t;

step 3: when an error of the position prediction data satisfies a first normal distribution with a mean value of 0, and an error of the position observation data satisfies a second normal distribution with a mean value of 0, respectively determining standard deviations of the first normal distribution and the second normal distribution;

step 4: updating $\sigma_2$, wherein $\sigma_2$ is the standard deviation of the second normal distribution satisfied by an error of position observation data l(t) at the current sampling moment t, and the updated standard deviation $\sigma_2$ is used for calculating position estimation data at the current sampling moment;

step 5: updating the position prediction data at the current sampling moment t according to the following equation:

$$\hat{Z}(t) = o(t) + \frac{\sigma_1^2}{\sigma_1^2 + \sigma_2^2} \cdot (l(t) - o(t)),$$

wherein $\hat{Z}(t)$ is the position prediction data at the current sampling moment t, and $\sigma_1$ is the standard deviation of the error of the position observation data at the current sampling moment t meeting the normal distribution with the mean value of 0; and step 6: determining position prediction data of a next sampling moment according to the position estimation data at the current sampling moment, the position data sequence, and the position prediction model, wherein the model parameter of the position prediction model has been updated in step 1, and entering the next sampling moment to iteratively execute steps 1 to 5 until the position prediction data of the moving object meets an iteration ending condition.

2. The method according to claim 1, wherein the updating $\sigma_2$ comprises:

maintaining $\sigma_2$ unchanged when $$\frac{|l(t) - o(t)|}{o(t)} \leq 20\%;$$

updating $\sigma_2$ to $$\sigma_2 \times \left(1 + \frac{|l(t) - o(t)|}{o(t)}\right)$$

when $$\frac{|l(t) - o(t)|}{o(t)} > 20\%.$$

3. The method according to claim 1, wherein the determining of the position prediction data of the next sampling moment according to the position estimation data at the current sampling moment, the position data sequence, and the position prediction model comprises:

adding the position estimation data at the current sampling moment to the position data sequence to obtain a new position data sequence; and determining the position prediction data of the next sampling moment according to the new position data sequence and the position prediction model after the model parameter is updated.

4. The method according to claim 1, wherein the moving object is a ship, and the method further comprises:

before step 1, acquiring a channel parameter and a bridge structure parameter of a sea area at which a cross-sea bridge is located; and when the ship sails into the sea area at which the cross-sea bridge is located, inputting the channel parameter and the bridge structure parameter into an Automatic Identification System AIS to obtain position observation data at a plurality of continuous sampling moments of the ship comprising the position observation data at the current sampling moment output by the AIS.

5. The method according to claim 4, wherein the iteration ending condition comprises: the position prediction data of the ship being located in a position data range outside the sea area at which the cross-sea bridge is located, wherein the sea area at which the cross-sea bridge is located is determined according to the channel parameter and the bridge structure parameter.

6. The method according to claim 1, wherein after the determining the position prediction data of the next sampling moment according to the position estimation data at the current sampling moment, the position data sequence and the position prediction model after the model parameter is updated, the method further comprises:

outputting the position prediction data of the next sampling moment.

7. An electronic device, comprising:

one or more processors; and a memory configured to store one or more programs, wherein:

when the one or more programs are executed by the one or more processors, the one or more processors are enabled to implement the position estimation and prediction method for the moving object according to any one of claim 1.

* * * * *